(12) United States Patent
Albritton

(10) Patent No.: US 8,360,050 B1
(45) Date of Patent: Jan. 29, 2013

(54) METHOD AND SYSTEM FOR OPERATING A THERMAL SOLAR SYSTEM USING A REVERSE MOTOR CONFIGURATION FOR THAWING ICE

(75) Inventor: Charles Wade Albritton, Hercules, CA (US)

(73) Assignee: EchoFirst, Inc., Fremont, CA (US)

( * ) Notice: Subject to any disclaimer, the term of this patent is extended or adjusted under 35 U.S.C. 154(b) by 300 days.

(21) Appl. No.: 12/709,308

(22) Filed: Feb. 19, 2010

Related U.S. Application Data

(60) Provisional application No. 61/153,939, filed on Feb. 19, 2009.

(51) Int. Cl.
*F24J 2/46* (2006.01)
(52) U.S. Cl. ........ 126/570; 126/588; 126/598; 126/621; 126/623
(58) Field of Classification Search .................. 126/570, 126/588, 598, 621, 623; 136/206, 244
See application file for complete search history.

(56) References Cited

U.S. PATENT DOCUMENTS 6,018,123 A * 1/2000 Takada et al. ................. 136/248
2006/0118163 A1 6/2006 Plaisted et al.

* cited by examiner

*Primary Examiner* — Alfred Basichas
(74) *Attorney, Agent, or Firm* — Richard T. Ogawa; Ogawa P.C.

(57) ABSTRACT

A method for operating a thermal solar system, e.g., solar system, photovoltaic system, thermal system, includes providing a thermal array including a plenum. The thermal array may be subjected to a freezing condition, which can include, for example, one or more ice particles and/or crystals, e.g., ice crystal, frost, snow, sleet. The method includes operating a fan device coupled to a drive device in a first direction to cause fluid flow from a second region to a first region that includes at least the plenum for the thermal array. The fan is coupled to the drive device disposed in a fluid flow region between the first region and second regions. The method also includes transferring thermal energy to the thermal array using at least the flow of fluid from the second region to the first region to cause the one or more ice particles and/or crystals to thaw for removal of the one or more ice particles and/or crystals.

20 Claims, 8 Drawing Sheets

ENERGY TRANSFER MODULE

Forward Air Flow

METHOD AND SYSTEM FOR OPERATING A THERMAL SOLAR SYSTEM USING A REVERSE MOTOR CONFIGURATION FOR THAWING ICE

CROSS-REFERENCES TO RELATED APPLICATIONS

This application claims priority to U.S. Provisional Patent Application No. 61/153,939, filed Feb. 19, 2009, commonly owned and incorporated by reference in its entirety for all purposes.

BACKGROUND OF THE INVENTION

The present invention relates to operation of a thermal solar system. More particularly, the present invention provides a method and system for using a reverse flow configuration to introduce thermal energy to a thermal solar system, which has been subjected to ice or other frost condition, for thawing purposes. Merely by way of example, the present invention has been applied to a thermal solar module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in an average temperature of the Earth's air near its surface, which is projected to continue to increase at a rapid pace. Warming is believed to be caused by greenhouse cases, which are derived, in part, from use of fossil fuels. The increase in temperature is expected to cause a rise in temperature, extreme weather conditions, and higher sea levels. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

Embodiments of the present invention provide techniques related to operation of a thermal solar system. More particularly, embodiments of the present invention provide a method and system for using a reverse flow configuration to introduce thermal energy to a thermal solar system, which has been subjected to ice or other frost condition, for thawing purposes. Merely by way of example, the present invention has been applied to a thermal solar module configured on a building structure, but it would be recognized that the invention has a much broader range of applications.

In a specific embodiment, a method for operating a thermal solar system, e.g., solar system, photovoltaic system, thermal system, includes providing a thermal array including a plenum, operating a fan device coupled to a drive device in a first direction to cause fluid flow from a second region to a first region, and transferring thermal energy to the thermal array using at least the flow of fluid from the second region to the first region to cause one or more ice particles and/or crystals to thaw for removal of the one or more ice particles and/or crystals.

In this specific embodiment, the first region includes at least the plenum for the thermal array, the fan is coupled to the drive device disposed in a fluid flow region between the first region and the second region. The method can be used, for example, when the present thermal array is subjected to a freezing condition, which can include, but are not limited to one or more ice particles and/or crystals, e.g., ice crystal, frost, snow, sleet.

In another specific embodiment, a solar energy system includes a thermal solar system comprising a plurality of thermal modules spatially configured as an N by M array, where N is an integer greater than 1, and M is an integer greater than 2. In a preferred embodiment, the plurality of thermal modules are configured to form an aperture region and a backside region. The system also includes an air plenum configured from at least the backside region, and has a first duct coupled to the one or more exhaust regions. The system also has a fluid flow region having a fluid flow intake region coupled to the first duct region, a fluid flow exit region, and an fluid drive region spatially disposed between the fluid flow intake region and the fluid flow exit region. The system has an air moving device comprising a drive device coupled to a blower device, the drive device being spatially disposed within the fluid drive region.

One or more logic devices are operably coupled to the air moving device and configured to operate the blower device in a first direction to cause fluid flow from the second region to the first region. The one or more logic device can be derived from a controller, ladder logic, or other forms of control, and the like. The system has a second duct coupled to the fluid flow exit region and to a third region, the third region having a temperature of greater than about 40 Degrees Fahrenheit or can be at other temperatures (e.g., 60 Degrees Fahrenheit), which are capable of thawing and/or melting ice, frost, or other forms of solid water. In a preferred embodiment, the system is configured to thaw ice, frost, or other solid forms of water from a solar array or the like.

Embodiments of the present invention can provide one or more of the following benefits over conventional techniques. For example, the present technique provides an easy to use process that relies upon conventional technologies such as thermal solar modules and drive devices, although other elements can also be used. Additionally, the method provides a process that is compatible with the instant thermal solar system without substantial modifications to equipment and processes. Preferably, embodiments of the invention provide for an improved solar module operation procedure, which is less costly and easy to handle. Such solar module operation system uses a drive device coupled to a blower, which can be configured to add thermal energy to a thermal solar module to defrost or thaw ice particles and/or crystals according to a preferred embodiment. In a specific embodiment, the solar module system and operation can be configured using computer software from a controller or other processing device or other logic devices. Depending upon the embodiment, one or more of these benefits may be achieved. These and other potential benefits will be described in more detail throughout the present specification and more particularly below.

A further understanding of the nature and advantages of the present invention may be realized by reference to the remaining portions of the specification and the drawings.

BRIEF DESCRIPTION OF THE DRAWINGS

FIG. 8 is a simplified plot of temperature for snow or frost removal according to an embodiment of the present invention.

DETAILED DESCRIPTION OF THE INVENTION

Embodiments of the present invention provide techniques related to operation of a thermal solar system. More particularly, the present invention provides a method and system for using a reverse flow configuration to introduce thermal energy to a thermal solar system, which has been subjected to ice or other frost condition, for thawing purposes. Merely, by way of example, the present invention has been applied to a thermal solar module configured on a building structure, but it would be recognized that the invention has a much broader range of applications.

The description below will be with reference to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
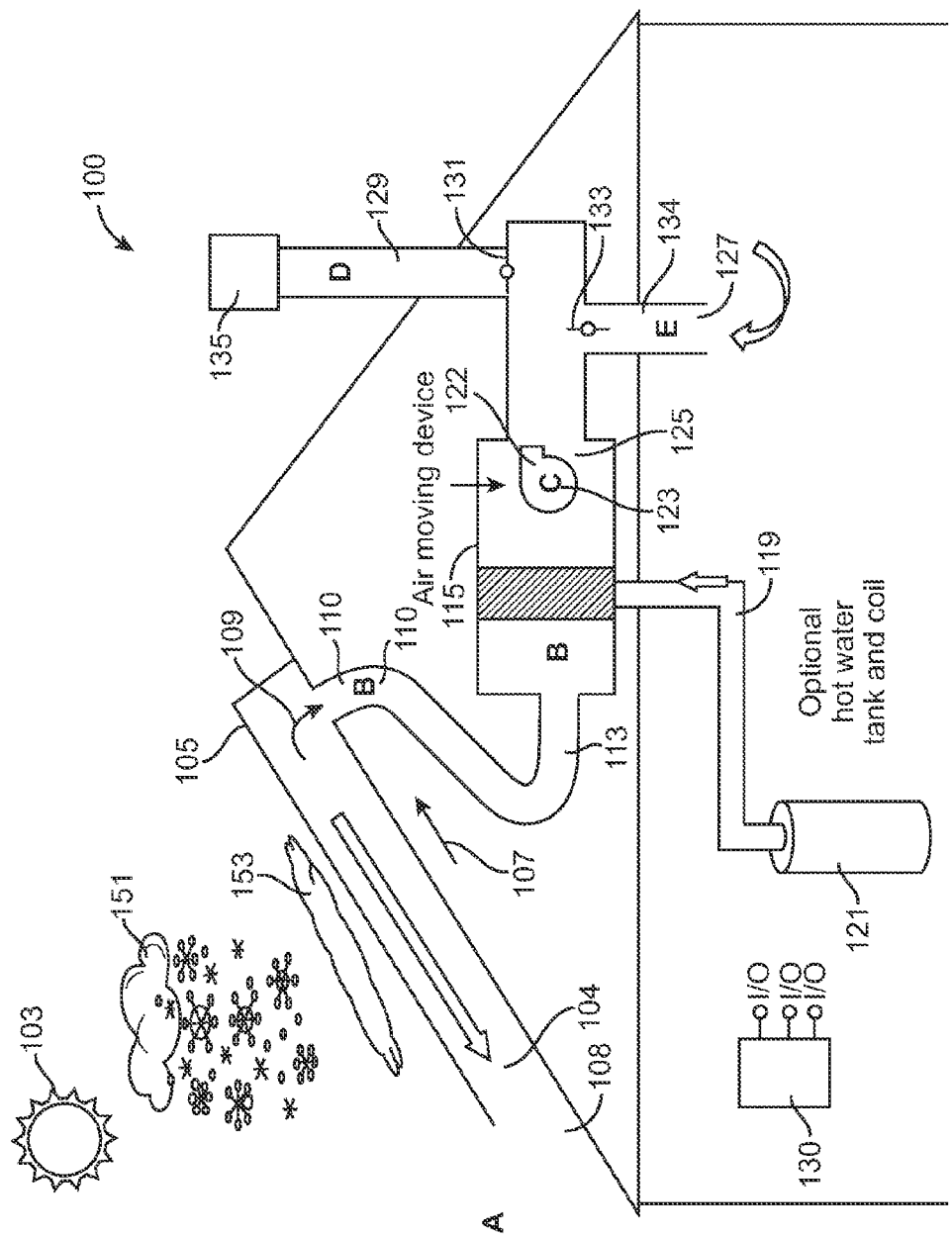
FIG. 1 is a simplified side view diagram of a thermal solar system being defrosted according to an embodiment of the present invention.

FIG. 1 is a simplified side view diagram of a thermal solar system according to an embodiment of the present inventions. As shown, the thermal solar system 100 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules are configured to form an aperture region 105 and a backside region 104. In one or more embodiments, the thermal solar modules can be combined with photovoltaic modules or solely thermal modules or photovoltaic modules configured for thermal use to provide a heat source.

In a specific embodiment, electromagnetic radiation 103 from the sun or other radiation source illuminates on the aperture region. In one or more embodiments, thermal energy is transferred through the solar module and applies the thermal energy to a working fluid 109 such as air, which traverses 107 in an upward direction through an air plenum 108 configured from at least the backside region. In a specific embodiment, the air plenum has one or more intake regions and one or more exhaust regions 110. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array.

Referring again to FIG. 1, the system has a first duct 110 coupled to the one or more exhaust regions 110. In a specific embodiment, the first duct can couple into a fluid flow region 115 having a fluid flow intake region 113 coupled to the first duct region, a fluid flow exit region 125, and an fluid drive region 123 spatially disposed between the fluid flow intake region and the fluid flow exit region. As used herein, the terms "fluid exit region" "fluid flow intake region" "fluid drive region" and others are not intended to be limiting and should be interpreted by ordinary meaning. Also shown are valves or dampers 131 133 which respectively connect to air pathways 129 and 134 to an outside region via exhaust 135 or back into a building structure via exhaust 127.

In one or more preferred embodiments, the system is subjected to cooler weather 151. Such cooler weather includes frost, snow, sleet, rain, and other conditions that lead to snow, ice, frost, or other forms of solid water 153 to be subjecting one or more portions of the thermal solar system, including plenum region according to one or more embodiments. The solid water is preferably removed before operating the thermal solar system. To do so, the present method provides the thermal array including plenum, as shown. In one or more embodiments, the present thermal array is subjected to a freezing condition, which can include, but are not limited to one or more ice particles and/or crystals, e.g., ice crystal, frost, snow, sleet.

In a specific embodiment, the present method includes operating a fan device coupled to a drive device in a first direction to cause fluid flow from a second region to the first region. In one or more embodiments, the second region can be from exhaust 135 or from an interior of a building 127 or other spatial region including combinations. The first region includes at least the plenum for the thermal array. The fan is coupled to the drive device disposed in a fluid flow region between the first region and the second region. The method includes transferring thermal energy to the thermal array using at least the flow of fluid from the second region to the first region to cause the one or more ice particles and/or crystals to thaw for removal of the one or more ice particles and/or crystals.

In one or more preferred embodiments, fluid flow occurs using the air moving device through heat exchanger, which is coupled to hot water. The fluid flow is heated using the hot water, which cycles through the heat exchanger. Hot fluid flow exits from the heat exchanger through duct to the plenum region, which transfers thermal energy to the ice particles and/or crystals to cause them to thaw and be removed. In a specific embodiment, the fluid flow is at a temperature of at least a desired value to thaw ice, frost, or other forms of solid water upon entering the plenum via the reverse flow. In a specific embodiment, the fluid flow occurs from a long enough time to substantially remove the ice particles and/or crystals. In a specific embodiment, once the crystals have been removed, the present method initiates reversal of the fluid flow by changing a direction of the drive motor to lead fluid flow from the intake region 108 to exit region 110 and back through the heat exchanger. Of course, there can be other variations, modifications, and modifications.

In a specific embodiment, the system has an air moving device 122 comprising a drive device coupled to a blower device. In a preferred embodiment, the drive device is spatially disposed within the fluid drive region. In a specific embodiment, the drive device comprises an electric motor. That is, the drive device comprises an electric motor with high temperature windings, which can withstand about 165 Degrees F. As merely an example, the electric motor is a Class F and greater under the trade association for the association of electrical and medical imaging equipment manufacturers, commonly called "NEMA." In a specific embodiment, the drive device is operable at a range from about 400 RPM to 4000 RPM, but can be others. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 200 Degrees Fahrenheit based upon the temperature insulation rating of the drive device, which is spatially disposed within the air flow region. Further details of the fluid flow for cooling the drive device can be found in co-pending application Provisional Application titled "Method and System for Operating a Thermal Solar System Using a Reverse Motor Configuration," in the name of Albritton, Charles Wade and listed as Application No. 61/141,642 filed Dec. 30, 2008, commonly assigned, and hereby incorporated by reference herein.

In a specific embodiment, the system has one or more sensing device coupled to the controller device. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. As an example, the sensing device can be a snap action bi-metal or the like or others. Of course, there are other variations, modifications, and alternatives.

In a specific embodiment, the system also has a controller 130 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. As an example, such controller can be one developed by PVT Solar or other suitable companies such as Siemens Programmable Logic Controller, or others. Further details of a controller can be found throughout the present specification and more particularly below.

In a specific embodiment, the controller is configured to operate the blower device in a first direction to cause fluid flow from at least the fluid flow intake region to the fluid flow exit region to introduce thermal energy to the array for thawing ice and other forms of solid water. In other embodiments, the controller can be configured to maintain a temperature of no greater than about 200 Degrees Fahrenheit within the fluid drive region. In a specific embodiment, the air moving device and preferably drive device 122 are maintained below about 200 Degrees Fahrenheit or more preferably 160 Degrees Fahrenheit or more preferably 145 Degrees Fahrenheit, but can be others. In a preferred embodiment, the controller is configured to send one or more signals to at least change the first direction of operation of the blower device to a second direction to cause fluid from a third region to flow into the fluid drive region to introduce thermal energy to the array device, which is in a freezing state and/or initiate removal of thermal energy from the fluid drive region. In a specific embodiment, the third region can be from an interior region 127 of a building structure and/or ambient region 135, such as exhaust to the air. In a preferred embodiment, cool air from the third region traverses back across the drive device to remove thermal energy there from to prevent damage to the drive device. Alternatively, warmer air can be used to thaw the array in one or more embodiments.

Referring again to FIG. 1, the system has a second duct 125 coupled to the fluid flow exit region. In a specific embodiment, the second duct region is coupled to the third region. As shown, the system can also include a heat exchanger 117 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 119, which preheats water for the hot water tank 121 or other heating apparatus. In other embodiments, the heat exchanger is configured to introduce thermal energy to fluid flow for thawing the array device. Further details of the present system and related methods can be found throughout the present specification and more particularly below. A detailed description of the present rack structure and thermal solar module are described more particularly below.

Figure 2:
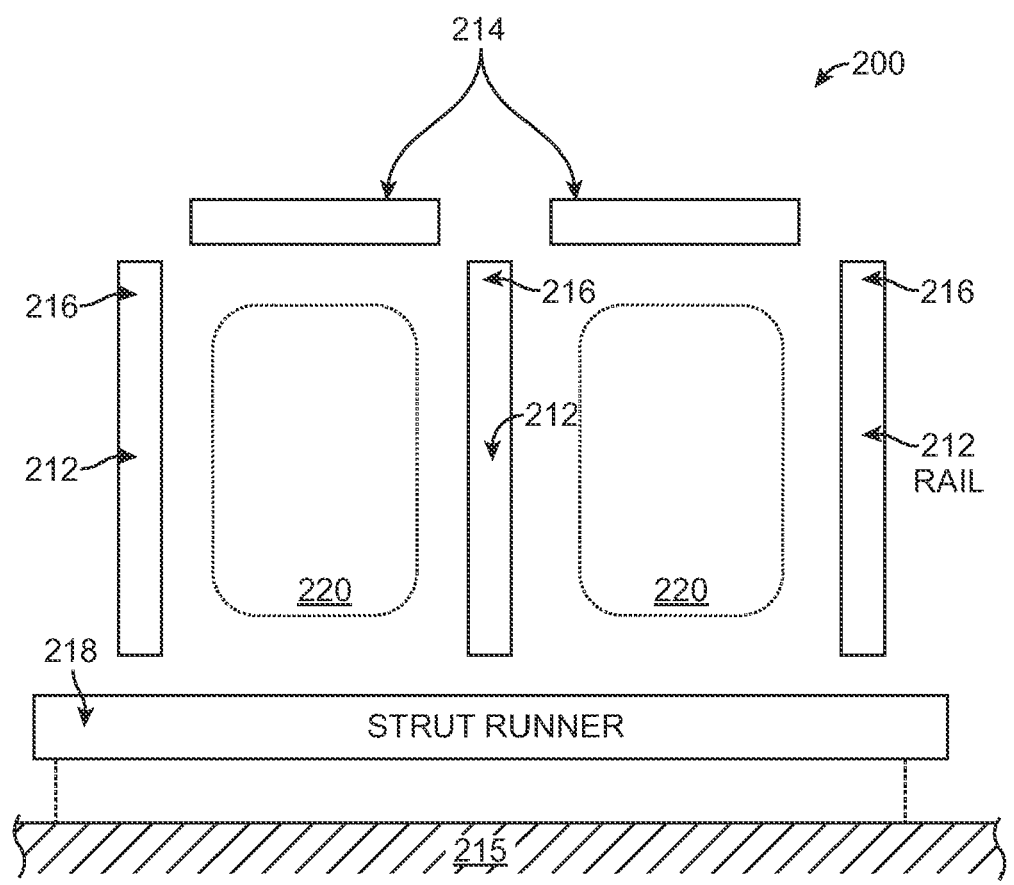
FIG. 2 is a simplified side view diagram of a rack assembly for a solar system according to an embodiment of the present invention.

FIG. 2 is a simplified side view diagram of a rack assembly for a solar system according to an embodiment of the present invention. As shown, the rack assembly is form supporting solar modules, under one or more embodiments of the invention. In a specific embodiment, the rack assembly 210 includes a plurality of rail structures 212 that provide support for individual solar modules 214. When installed, the rail structures 212 support the individual solar modules 214 a given height h above an underlying body 215. The underlying body 215 may correspond to any surface, platform or structure on which solar modules 214 are mounted. For example, underlying body 215 may correspond to a rooftop of a commercial or residential building or other suitable structure. The solar modules 214 may correspond to photovoltaic solar cells that convert solar energy into electricity, or alternatively, solar heating modules which directly generate heat using solar energy. Alternatively, the solar cells can be a combination of photovoltaic and thermal modules according to one or more embodiments.

According to one or more embodiments, the rail structures 212 are adjustable pair-wise, or in other combinations, in order to hold in place solar modules 214 of various dimensions and sizes. In one or more embodiments, the solar modules 214 are supported by a combination of retention structures 216. Each retention structure 216 may be provided with a corresponding one of the rail structures 212. In one or more embodiments, each retention structure 216 is a structural feature of the corresponding rail structure 212. For example, each rail structure 212 may comprise of multiple interconnected segments, and the retention structure(s) may be one of the interconnected elements. Alternatively, the retention structures 216 may be integrated or unitarily formed with the individual rail structures 212. Each retention structure 216 supports individual solar modules 214 by grasping edge segments. In one or more embodiments, the retention structures 216 and/or rail structures 212 are adjustable to grasp and support solar modules 214 of varying thicknesses and forms.

Referring again to FIG. 2, an embodiment provides that rail structures 212 are mounted indirectly to the underlying body 215 through use of a set of strut runners 218. Each strut runner 218 mounts to the underlying body 215 and to multiple rail structures 212, thus providing lateral support to maintaining the rail structures 212 upright, while at the same time providing a buffer between the individual rail structures 212 and the underlying body 215. The rail structures 212 may mount to the strut runners 218, and the strut runners may mount to the underlying body 215.

According to an embodiment, the rack assembly 210 forms a portion of a solar heat exchange system that uses heat generated from the solar modules 214 for any one of various useful purposes. The heat exchange may be enabled by the formation of one or more channels 220 between an underside of solar modules 214 and the underlying body 215. An individual channel 220 may be defined in part by one or more of the rail structures 212, as well as the underlying body and possibly the underside of the solar modules 214. The individual channel 220 may occupy at least a portion of the thickness defined by the height h. The solar heat exchange system may further include other components, such as a plurality of thermal panels, as well as air directors that draw air into the channel 220, and/or push the air through the channel. When installed as part of a solar heat exchange system, the rack assembly 210 may be positioned to supply heated air to such air directors, and to be proximate to the environment that is to receive or use the heated air. For example, the rack assembly 210 may be installed on the rooftop of a dwelling, and also direct heated air into a vent or air circulation system of the dwelling as part of its ability to heat air in the channel 220. Useful purposes for generating heat from the solar modules 214 may include, for example, any one or more of the following: (i) cooling the individual solar modules 214 (when photovoltaic) so as to make them more efficient, (ii) pulling air from the environment underneath the solar modules 214 for purpose of heating the air for another closed environment or system (e.g. for a house), and (iii) circulating air from the closed environment or system underneath the solar modules 214 to heat that air and use it for heat.

Figure 3:
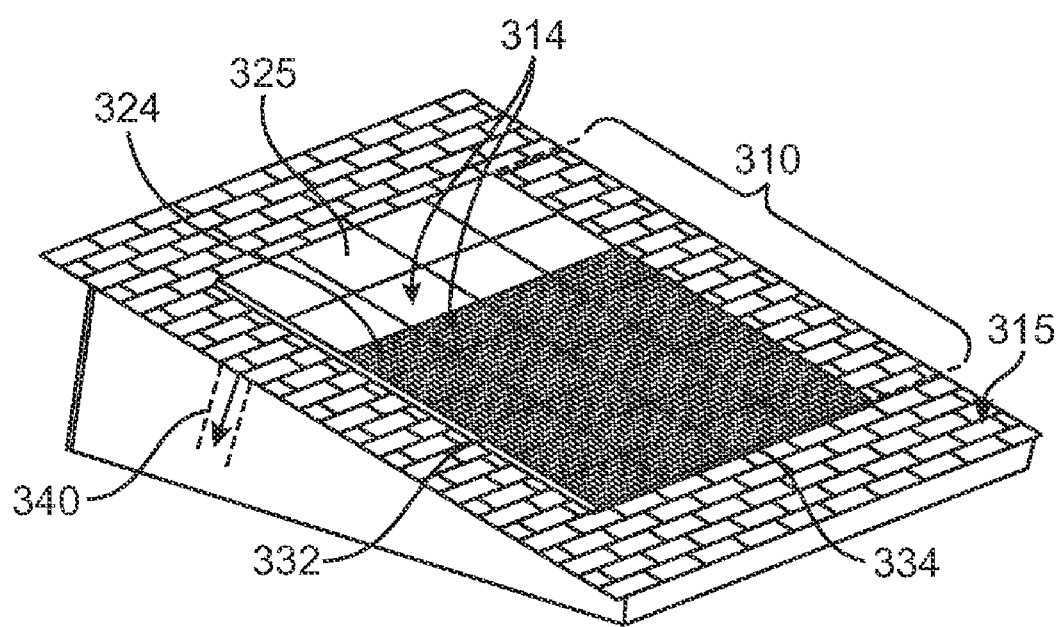
FIG. 3 is a simplified perspective view diagram of a solar system according to an embodiment of the present invention.

FIG. 3 is a simplified perspective view diagram of a solar system according to an embodiment of the present invention. As shown, the rack assembly 310, which is installed, that supports a set of solar modules 314 over an underlying body 315. The rack assembly 310 may be structured and adapted to include features such as described with one or more embodiments of the invention. The underlying body 315 may correspond to, for example, a rooftop or roof structure of a building or dwelling. In general, the underlying body 315 may correspond to any area, surface or platform that can receive sunlight and be connected to a building, place or location that can use the solar energy.

Figure 4:
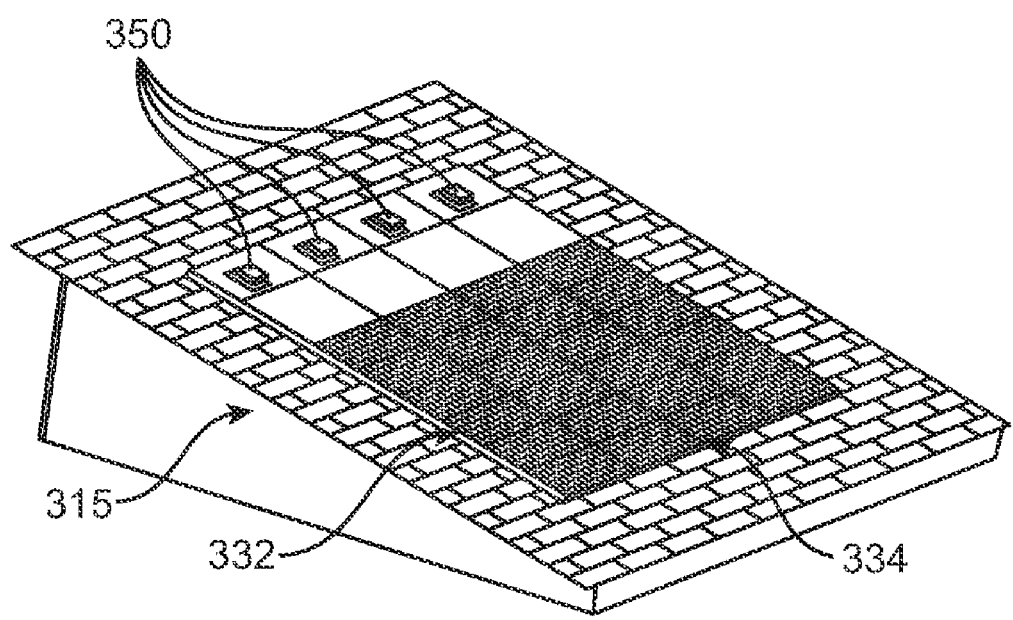
FIG. 4 is a simplified perspective view diagram of a solar system according to an alternative embodiment of the present invention.

Embodiments of the invention contemplate that different types of solar modules 314 may be employed in various implementations and context. For example, as shown by the simplified diagram of FIG. 4, the solar modules 314 include photovoltaic modules 324 and thermal modules 325. Under one or more embodiments, the perimeter may include one or more sealed lengths 332 and an open length 334 from which air from the environment is drawn. As will be described, channels (not shown) may be provided between the rack assembly 310 and underlying body 315 for purpose of constraining airflow. Air drivers (not show) may drive (e.g. push or pull) air within the formed channels. The solar modules 314 generate heat, either through design or as an inherent by-product. According to one or more embodiments, this heat warms the air as it is drawn from the environment and pulled through the channels formed underneath the solar modules 314.

Various alternatives and variations are contemplated. For example, all of the perimeter of the rack assembly 310 may be sealed, and air may drawn from within a dwelling on which the rack assembly 310 is provided. This air may be pushed through channels, then back into the dwelling when warmed. Alternatively, some or all of the open length 334 may be sealed, or conversely, portions of the sealed lengths 132 may be opened or perforated as part of an underlying channel system. As shown, FIG. 3 illustrates an implementation in which heated air is directed into a duct 340 within a structure of the underlying body 315. For example, warm air may heat a dwelling on which the rack assembly 310 is installed, and the duct 340 enables the heated air to flow into the circulation system of the dwelling. As mentioned, the solar modules 314 may be formed by a combination of the photovoltaic modules 324 and the thermal modules 325. The photovoltaic modules 324 can generate some residual heat when receiving solar energy and converting the solar energy into electrical current. In contrast, the thermal modules 325 may directly convert the solar energy into heat at a higher efficiency. The use and number of thermal modules 325 may depend on the use of the heated airflow, as well as the environment where the rack assembly 310 is installed. For example, when the purpose of heating air in the channels is to supply warm air to a dwelling of the underlying body 315, the thermal modules 325 have more use in colder environments, while warm environments may require only use of photovoltaic modules 324. Even in cold environments, thermal modules 325 may be used to convert solar energy into hot air due to the high operating efficiency achieved by their designs, and additional components may be used to drive the hot air into the dwelling.

Referring again to FIG. 4, multiple ventilation outlets 350 may be employed for directing heated air from under the rack assembly. As such, the ventilation outlets are located underneath the thermal modules 325. As shown with FIG. 3, the open length 334 of the perimeter is provided on one side, and the series of vents 350 are provided lengthwise on the other side of the perimeter formed by the rack assembly 310. For example, the vents 350 may guide the directed heated air inward into the structure of the underlying body 315. As merely an example, further details of the rack assembly can be found in United States Patent Application Publication 20060118163 A1 in the names of Joshua Reed Plaisted et al., commonly assigned, and hereby incorporated by reference herein. Other rack assemblies can also be used according to one or more embodiments.

Figure 5:
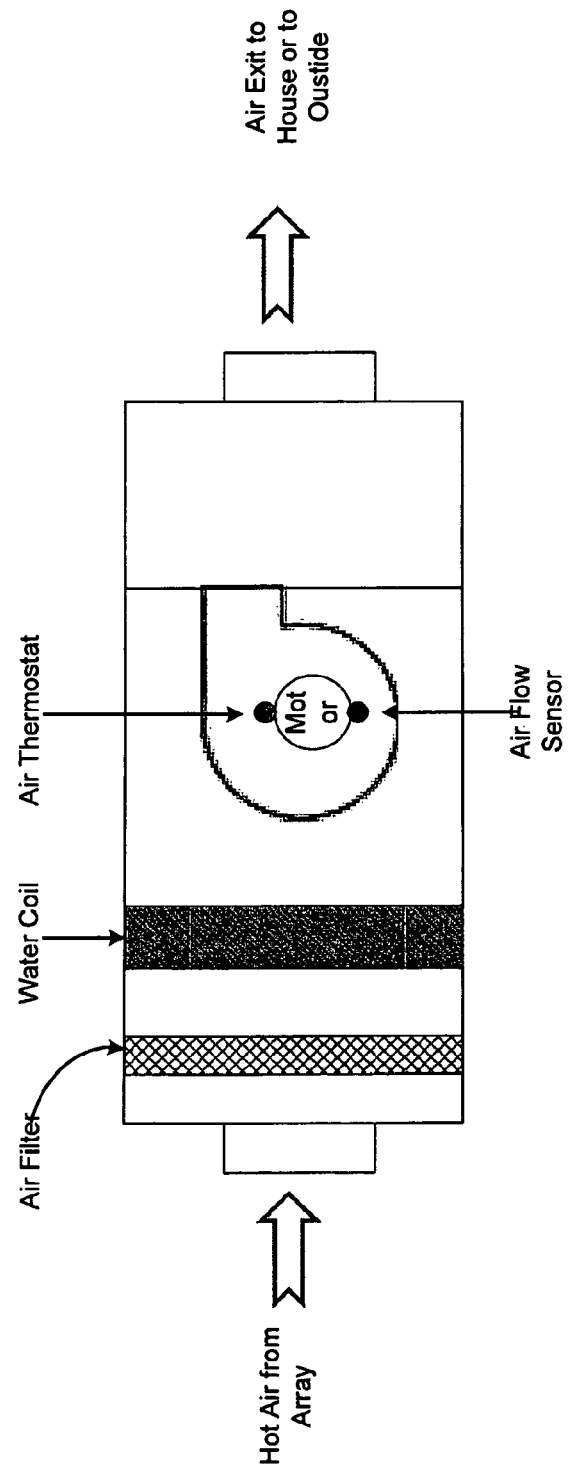
FIG. 5 is a detailed diagram of a drive device coupled to a blower device according to an embodiment of the present invention.

FIG. 5 is a detailed diagram of a drive device coupled to a blower device according to an embodiment of the present invention. As shown, the drive device is coupled to a blower within a energy transfer module according to a specific embodiment. In a specific embodiment, the blower device is configured to operate in reverse operation to introduce thermal energy to the array device, which has subjected to a freezing condition. The reverse operation takes warmer air from one or more regions and transfers the thermal energy to the array to defrost or thaw the array device, including the plenum.

Alternatively, once the thermal array defrosts, hot air from the array is inputted into the module through an orifice according to a specific embodiment. The hot air is filtered using a suitable filter design according to a specific embodiment. In one or more embodiments, the hot air traverses through a heat exchanger including a water coil, which receives thermal energy from the hot air from the array. In a specific embodiment, the hot air leaving the water coil is cooler as it traverses through the blower device, which outputs the air through an air exit to an interior region of a building structure or other outlets. In a specific embodiment, the blower includes an air thermostat coupled to one or more portions of the motor. In alternative embodiments, the blower also includes one or more air flow sensors. Each of the sensor devices is coupled to a controller or other suitable logic device or devices. An example of a logic device can be found throughout the present specification and more particularly below.

Figure 6:
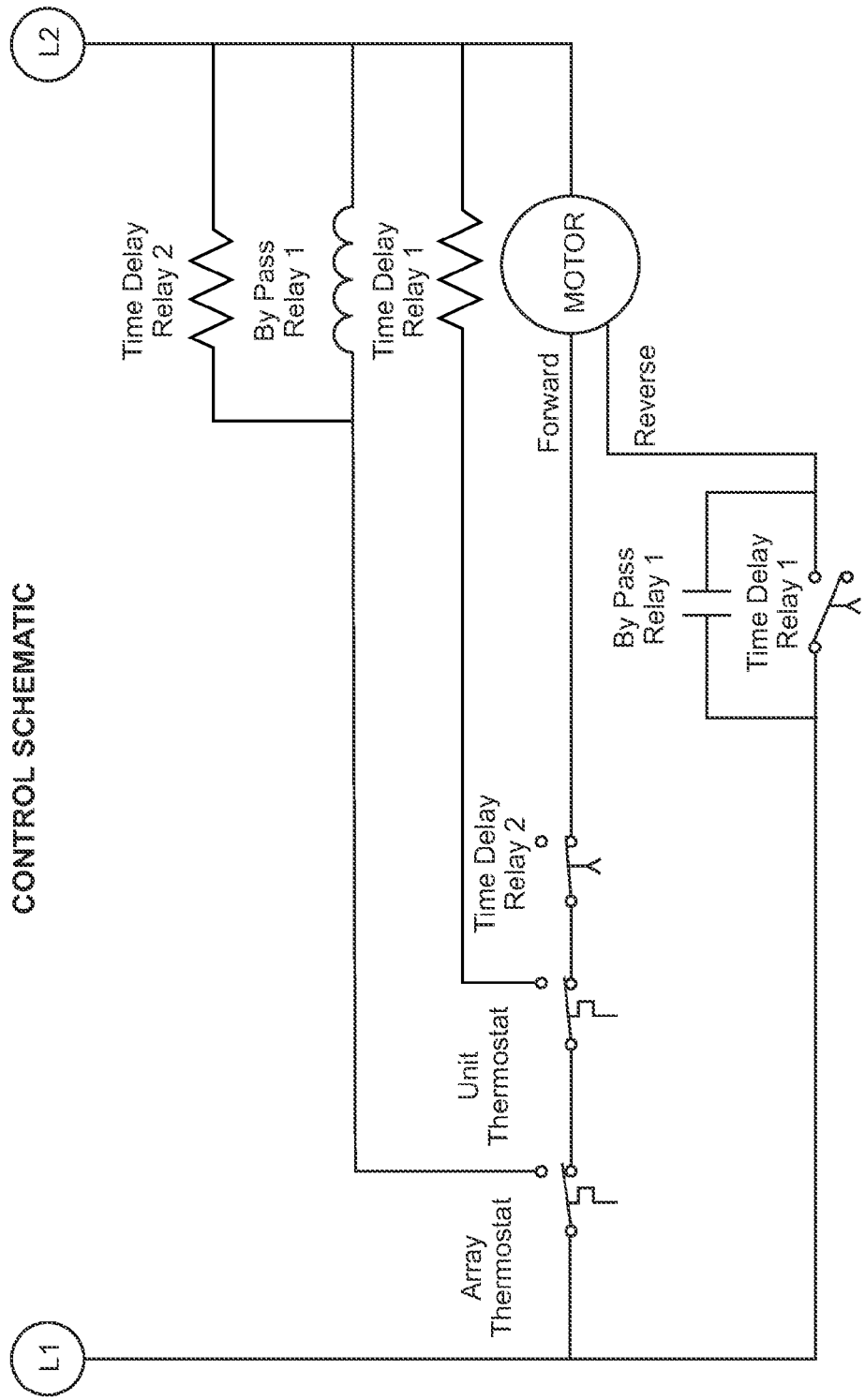
FIG. 6 is a simplified diagram of a control device for a thermal solar system according to an embodiment of the present invention.

FIG. 6 is a simplified diagram of a control device for a thermal solar system according to an embodiment of the present invention. As shown, the control device includes a control schematic coupled between L1 and L2 according to a specific embodiment. The schematic also illustrates Forward and Reverse configurations for the motor according to a specific embodiment.

In a specific embodiment, the present invention provides a method for operating a thermal solar system, which is briefly outlined below.
1. Initiate system;
2. Provide thermal solar system in a freezing condition, e.g., frost, ice, snow;
3. Operate a fan device coupled to a drive device in a first direction to cause fluid flow from a second region to the first region;
4. Transfer thermal energy to the thermal array using at least the flow of fluid from the second region to the first region;
5. Cause the one or more ice particles and/or crystals to thaw for removal of the one or more ice particles and/or crystals;
6. Change the direction of fluid flow from the first direction back to a second direction to continue operation of the thermal solar system;
7. Monitor the temperature and other parameters;
8. Perform other steps, as desired; and
9. Stop.

The above sequence of steps provides a method of operating a thermal solar system according to an embodiment of the present invention. In a specific embodiment, the present invention provides a method and resulting operation to thaw or defrost a thermal solar system. In a preferred embodiment, the method can be provided using a configured control device in the system using computer software and/or firmware. Other alternatives can also be provided where steps are added, one or more steps are removed, or one or more steps are provided in a different sequence without departing from the scope of the claims herein. Further details of the present method and system can be found throughout the present specification and more particularly below.

Figure 7:
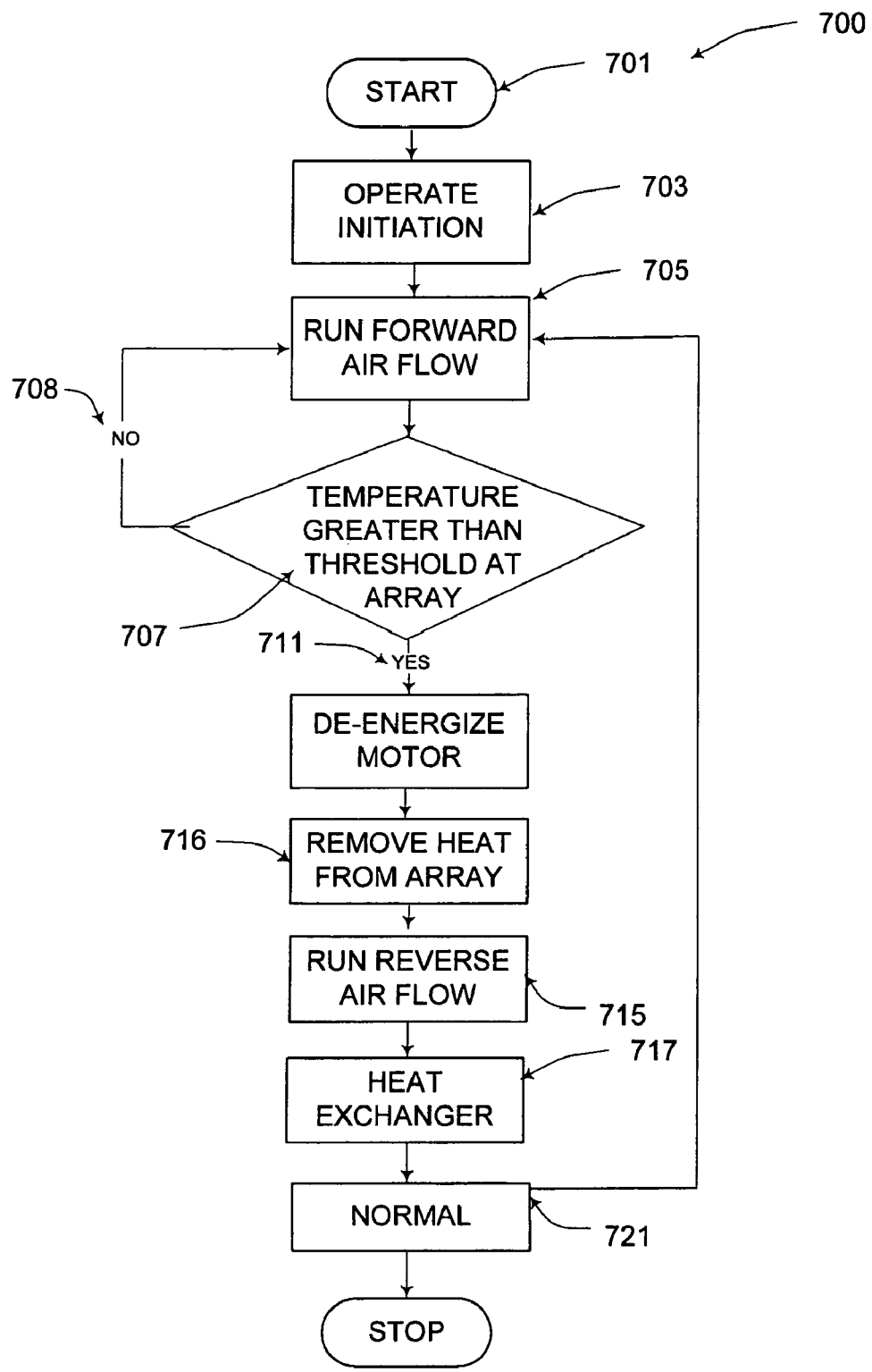
FIG. 7 is a simplified flow diagram of a method of operating a blower device in reverse configuration according to an embodiment of the present invention.
Figure 9:
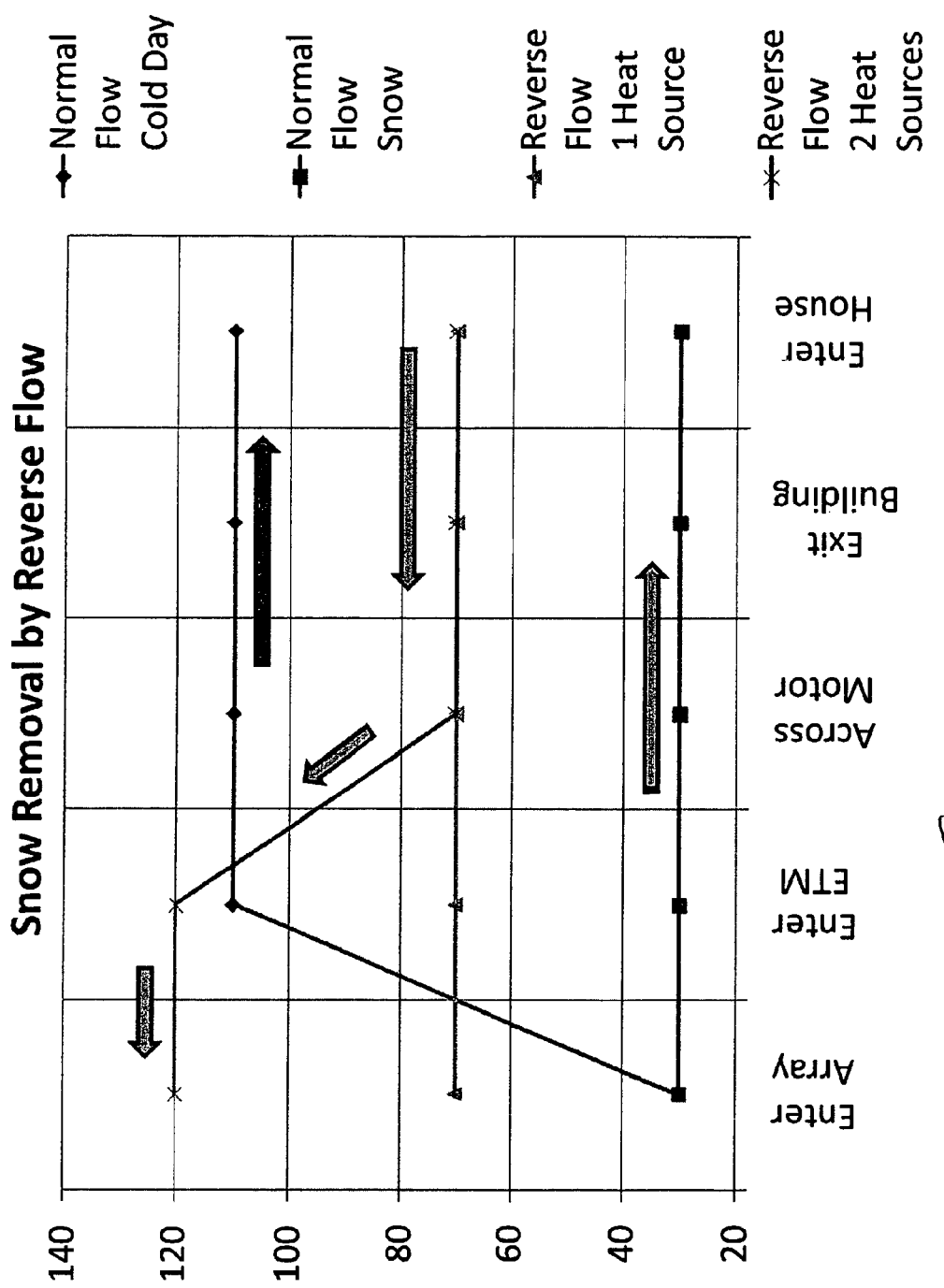

FIG. 7 is a simplified flow diagram 700 of a method of operating a blower device in reverse configuration according to an embodiment of the present invention. As shown, the present method provides for a method for operating a thermal solar system, which is briefly outlined below. In a specific embodiment, the thermal solar system can be the one described herein as well as others. As shown, the method begins with start, step 701.

In a specific embodiment, the method initiates operation (step 703) of the thermal solar system. The system includes a thermal solar system comprising a plurality of thermal modules spatially configured as an N by M array, where N is an integer greater than 1, and M is an integer greater than 2. In a specific embodiment, the plurality of thermal modules are configured to form an aperture region and a backside region. In a preferred embodiment, the aperture region faces the sun or other lighting source. In a specific embodiment, the system has an air plenum configured from at least the backside region. In a specific embodiment, the air plenum has one or more intake regions and one or more exhaust regions. The system has a first duct coupled to the one or more exhaust regions. The system also has a fluid flow region, The fluid flow region has a fluid flow intake region coupled to the first duct region, a fluid flow exit region, and an fluid drive region spatially disposed between the fluid flow intake region and the fluid flow exit region.

In a specific embodiment, the system has an air moving device comprising a drive device (e.g., electric motor, geared electric motor)) coupled to a blower device such as a fan or other suitable air moving device. In a specific embodiment, the drive device is spatially disposed within the fluid drive region. The system has a controller operably coupled to the air moving device. In a preferred embodiment, the controller is configured to operate the blower device in a first direction to cause fluid flow from at least the fluid flow intake region to the plenum region to cause the array to defrost or thaw from ice particles and the like. In a specific embodiment, the controller is configured to cause the blower device to operate in reverse direction such that fluid flows from one or more regions to the plenum region to transfer thermal energy to the array. In a specific embodiment, the system further has a second duct coupled to the fluid flow exit region. In a specific embodiment, the second duct region is coupled to the third region, which provides warmer air for introducing thermal energy to the plenum and array to defrost it.

In a specific embodiment, referring back to FIG. 7, the method operates or runs (step 705) the fan device coupled to the drive device in a first direction to cause fluid flow from a first region to a second region. The method transfers fluid flow from the first region comprising the plenum for the thermal array to the second region using the fan coupled to the drive device disposed in the fluid flow region between the first region and the second region. As used herein, the terms "first" and "second" are not intended to imply order but should be interpreted by ordinary meaning. As shown, the method monitors (step 707) temperature to see if it is above a threshold temperature to complete removal of the freezing condition, if so, the method continues via branch 711 to now remove heat from the array, step 713. Alternatively, the method continues via branch 709 to continue to operate and run the drive device to continue to move air through the thermal solar array to defrost it according to a specific embodiment.

In a specific embodiment, the method maintains a desired temperature within the plenum region of the array. In a preferred embodiment, the method uses a controller configured to transfer signals to at least change (step 715) the first direction of operation of the fan device to a second direction to cause fluid from a third region to flow into the fluid flow region. In a specific embodiment, the method initiates transfer of the thermal energy from the fluid flow region by the change in direction using warmer air from the third region. That is, warmer air from the third region flows back through the fluid flow region and traverses the plenum region and array to introduce thermal energy for thawing and/or defrosting purposes.

In one or more preferred embodiments, fluid flow occurs using the air moving device through heat exchanger (step 717), which is coupled to hot water. The fluid flow is heated using the hot water, which cycles through the heat exchanger. Hot fluid flow exits from the heat exchanger through duct to the plenum region, which transfers thermal energy to the ice particles and/or crystals to cause them to thaw and be removed. In a specific embodiment, the fluid flow is at a temperature of at least 40 Degrees or 50 Degrees or 60 Degrees or 70 Degrees or 80 Degrees Fahrenheit upon entering the plenum via the reverse flow. In a specific embodiment, the fluid flow occurs from a long enough time to substantially remove the ice particles and/or crystals. In a specific embodiment, once the crystals have been removed, the present method initiates reversal (step 719) of the fluid flow by changing a direction of the drive motor to lead fluid flow from the intake region to exit region and back through the heat exchanger. In a specific embodiment, the method returns to normal operation, step 721 and may stop, step 723.

The above sequence of steps provides a method of operating a thermal solar system according to an embodiment of the present invention. In a specific embodiment, the present invention provides a method and resulting operation to thaw or defrost the thermal array before normal operation. In a preferred embodiment, the method can be provided using a configured control device in the system using computer software and/or firmware and/or other logic devices. Other alternatives can also be provided where steps are added, one or more steps are removed, or one or more steps are provided in a different sequence without departing from the scope of the claims herein.

FIG. 8 is a simplified plot of snow removal by reverse flow operation of a blower device according to an embodiment of the present invention. As shown, the vertical axis represents temperature in units of Fahrenheit and the horizontal axis represents modes of operation of the present thermal solar system. In a specific embodiment for "Normal Flow Cold Day," air enters the array at a temperature of about 30 Degrees Fahrenheit, exits the array at about 110 Degrees Fahrenheit, and remains substantially at such elevated temperature across the motor and exiting the building. In a specific embodiment for "Normal Flow Snow," air enters the array at a temperature of about 30 Degrees Fahrenheit, exits the array at 30 Degrees Fahrenheit, and remains substantially at such elevated temperature across the motor and exiting the building. As shown, snow substantially blocks the electromagnetic radiation and does not allow the air to increase in temperature as the air traverses through the array. The temperature of 30 Degrees Fahrenheit through the array is indicative of the array that is not functioning according to one or more embodiments.

In a specific embodiment, the present system and method can operate to introduce thermal energy to the array to remove and/or defrost the array. In operation of "Reverse Flow 1 Heat Source," air is removed from the house, through the exit, across the motor, and through the array at a temperature of about 70 Degrees Fahrenheit, which is higher than the outside air. The higher temperature thaws or defrosts the snow and/or ice formed overlying the aperture region of the array. In operation of "Reverse Flow 2 Heat Sources," air is removed from the house at about 70 Degrees Fahrenheit and increases in temperature to about 120 Degrees Fahrenheit as the air traverse through a heat exchanger, such as the one described herein as well as outside of the present specification. The increased temperature leads to thawing and/or defrosting snow and/or ice particles from at least the aperture region of the array among other regions of the solar system.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for operating a thermal solar system, the method comprising:
   providing a thermal array including a plenum, the thermal array being subjected to a freezing condition, the freezing condition comprising one or more ice particles and/or crystals;
   operating a fan device coupled to a drive device in a first direction to cause fluid flow from a second region to a first region, the first region comprising the plenum for the thermal array, the second region comprising an exhaust region and/or an interior region of a building;
   disposing a heat exchanger between the first region and the second region for the fluid flow to capture thermal energy; and
   transferring the thermal energy carried by the fluid flow from the second region to the first region to the thermal array to cause the one or more ice particles and/or crystals to thaw for removal of the one or more ice particles and/or crystals.

2. The method of claim 1 wherein the thermal array is at a temperature of zero degrees and less at the freezing condition.

3. The method of claim 1 wherein the drive device comprises an electric motor.

4. The method of claim 1 wherein the drive device comprises an electric motor with high temperature windings, the high temperature windings being configured to withstand about 165 Degrees F.

5. The method of claim 4 wherein the electric motor is a Class F and greater.

6. The method of claim 1 wherein drive device is operable at a range from about 400 RPM to 4000 RPM.

7. The method of claim 1 wherein the fan device comprises a centrifugal configuration operably coupled to the drive device.

8. The method of claim 1 wherein the fan device comprises a plurality of blades.

9. The method of claim 1 wherein the second region is at a second temperature and the first region is at a first temperature, the second temperature being higher than the first temperature.

10. The method of claim 1 wherein the second region is at a second temperature and the first region is at a first temperature, the second temperature being higher than the first temperature by at least 20 Degrees Fahrenheit.

11. The method of claim 1 wherein the fluid flow from the second region to the first region comprises air flow through the heat exchanger to maintain a temperature from about 40 Degrees Fahrenheit to about 100 Degrees Fahrenheit.

12. The method of claim 1 further comprising a controller device coupled to the drive device to control the fan device to cause the fluid flow in the first direction and to automatically initiate reversal of the fluid flow to a second direction from the first region to the second region after the removal of the one or more ice particles and/or crystals on the thermal array.

13. The method of claim 1 further comprising a controller device coupled to the drive device, the controller device coupled to one or more sensor devices operably coupled to the drive device.

14. The method of claim 1 further comprising a controller device coupled to the drive device, the controller device coupled to one or more sensor devices operably coupled to the drive device, the controller device comprising one or more computer readable memories having one or more codes configured to initiate the transfer of the thermal energy.

15. The method of claim 1 further a controller device coupled to one or more sensing devices within a vicinity of the first region or the second region.

16. The method of claim 1 further comprising a sensing device coupled within a vicinity of the first region or the second region.

17. The method of claim 1 wherein the fan device coupled to the drive device is maintained at a temperature of smaller than 200 Degrees Fahrenheit by drawing cool air in the first direction from either the interior of building or the exhaust region.

18. The method of claim 1 wherein the first direction is a reverse direction.

19. The method of claim 1 wherein the first direction is a reverse direction and a second direction is a primary direction to cause fluid flow from the first region to the second region.

20. The method of claim 1 wherein the heat exchanger is cycled through with hot water connected via piping to a water tank equipped with heating coils.

* * * * *